United States Patent
Bosco et al.

(10) Patent No.: US 9,694,627 B2
(45) Date of Patent: Jul. 4, 2017

(54) HUB-BEARING HAVING A LIGHT ALLOY ROTOR-HUB

(71) Applicant: Aktiebolaget SKF, Göteborg (SE)

(72) Inventors: Domenico Bosco, Borgaro Torinese (IT); Laura Sguotti, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 100 days.

(21) Appl. No.: 14/753,178

(22) Filed: Jun. 29, 2015

(65) Prior Publication Data
US 2016/0375725 A1    Dec. 29, 2016

(51) Int. Cl.
*B60B 27/00*     (2006.01)
*F16C 35/067*   (2006.01)
*F16C 19/28*    (2006.01)

(52) U.S. Cl.
CPC ...... *B60B 27/0005* (2013.01); *B60B 27/0042* (2013.01); *B60B 27/0078* (2013.01); *F16C 19/28* (2013.01); *F16C 35/067* (2013.01); *B60B 2360/10* (2013.01); *B60B 2380/12* (2013.01); *B60B 2380/73* (2013.01); *B60B 2900/111* (2013.01); *B60B 2900/114* (2013.01)

(58) Field of Classification Search
CPC ............ B60B 27/0005; B60B 27/0042; B60B 27/0078; F16C 19/28; F16C 35/067
See application file for complete search history.

(56) References Cited

U.S. PATENT DOCUMENTS

| | | | |
|---|---|---|---|
| 3,971,604 A * | 7/1976 | Kapaan | B60B 27/0005 384/513 |
| 4,473,129 A * | 9/1984 | Guimbretiere | B60B 27/0005 180/254 |
| 4,529,254 A | 7/1985 | Krude | |
| 5,486,053 A | 1/1996 | Beagley et al. | |
| 5,762,559 A | 6/1998 | Jacob | |
| 5,813,938 A | 9/1998 | Forster | |
| 6,170,919 B1 * | 1/2001 | Hofmann et al. | B60B 27/0005 301/105.1 |

(Continued)

FOREIGN PATENT DOCUMENTS

| | | |
|---|---|---|
| DE | 1902942 A1 | 8/1970 |
| DE | 3400701 A1 | 7/1985 |

(Continued)

*Primary Examiner* — Thomas R. Hannon
(74) *Attorney, Agent, or Firm* — Bryan Peckjian; SKF USA Inc. Patent Dept.

(57) ABSTRACT

A hub-bearing assembly provided with a bearing unit and a rotatable rotor-hub. The bearing unit includes a stationary radially outer ring, a couple of rotatable radially inner rings, and a double row of rolling elements, wherein the rolling elements are interposed between the outer ring and the inner rings, whose centers are located along a first circle having a radius, with respect to a symmetry axis of the assembly. The rotor-hub is made of a light alloy. A tubular portion is assembled on top of the radially inner rings. The tubular portion is steadily fixed a flange portion, axially external and includes a plurality of fixing holes. Axes of the fixing holes are located along a second circle defined by a radius respective to the symmetry axis of the assembly. The radius of the first circle (rolling elements) is greater than the radius of the second circle (fixing holes).

7 Claims, 3 Drawing Sheets

(56) References Cited

U.S. PATENT DOCUMENTS

| | | | | |
|---|---|---|---|---|
| 6,790,145 B2 * | 9/2004 | Niebling et al. | ........ | B60B 27/00 |
| | | | | 180/259 |
| 7,762,372 B2 * | 7/2010 | LeBlanc, Sr. et al. | .. | B60G 3/24 |
| | | | | 152/415 |
| 8,668,393 B2 * | 3/2014 | Siebeneick et al. | ...... | B60B 3/02 |
| | | | | 384/544 |
| 9,493,035 B2 * | 11/2016 | Bosco | ................... | B60B 27/065 |
| 2012/0055587 A1 * | 3/2012 | Vissers et al. | ......... | B22D 19/00 |
| | | | | 148/516 |

FOREIGN PATENT DOCUMENTS

| | | |
|---|---|---|
| DE | 10123683 A1 | 11/2002 |
| DE | 10128073 A1 | 12/2002 |
| DE | 102008051601 A1 | 6/2010 |
| EP | 1031439 B1 | 4/2005 |
| WO | 2005030499 A1 | 4/2005 |

\* cited by examiner

HUB-BEARING HAVING A LIGHT ALLOY ROTOR-HUB

CROSS REFERENCE TO RELATED APPLICATIONS

This is a Non-Provisional Patent Application, filed under the Paris Convention, claims the benefit of Italy Patent (IT) Application Number TO2014A000495 filed on 20 Jun. 2014 (20 Jun. 2014), which is incorporated herein by reference in its entirety.

TECHNICAL FIELD

The present invention relates to a hub-bearing assembly comprising a light alloy hub, configured as a rotor. This assembly is suitable for applications where the bearing inner ring is rotatable, in other words, for applications to a driving wheel of a motor vehicle.

BACKGROUND ART

To the state of the art hub-bearing assemblies of the flanged type for application to driving wheels of a motor vehicle are already known. An example is described in European patent EP 1031439 B1 and comprises a radially outer ring, a pair of radially inner rings and a double row of rolling elements (in this application, spheres) radially interposed between the outer ring and the pair of inner rings. The outer ring has a cylindrical external surface adapted to be forced with interference to insert the bearing in a cylindrical seat formed in the knuckle of a suspension. The radially inner rings are mounted on a steel flanged hub, rotationally coupled in a known way to the end portion of a spindle or an axle shaft of the transmission unit of a motor vehicle.

The flanged hub has a flange portion in which are formed the holes for a plurality of fastening means (for example, stud bolts) that connect in a known way an element of the wheel of the motor vehicle, for example the brake disc, to the flanged hub.

Such an embodiment requires that the flange portion of the flanged hub has high mechanical resistance characteristics. This implies that the flanged hub are made of high-strength material (steel, in the cited prior art), in order to limit the thickness and therefore the overall dimensions of the flanged portion. Alternatively, the flanged hub can be realized with a high thickness of the flanged portion, thus penalizing the overall axial dimensions, if they are made of lighter but also less resistant materials, for example aluminum or other light alloy. Therefore, the known solutions have the drawback of not allowing to obtain a flanged hub that is both lightweight and has small dimensions.

INVENTION SUMMARY OF THE PRESENT INVENTION

Aim of the present invention is to realize a hub-bearing assembly for a driving wheel of a motor vehicle, which overcomes the above mentioned inconveniences; in particular, purpose of the invention is to define a flanged hub made of light alloy and having reduced overall dimensions.

According to the present invention, a hub-bearing assembly is described, the hub-bearing assembly having:
a bearing unit comprising a stationary radially outer ring, a couple of rotatable radially inner rings, and a double row of rolling elements, wherein the rolling elements are interposed between the radially outer ring and the radially inner rings, whose centers are located along a first circle having a radius, with respect to a symmetry axis of the hub-bearing assembly; and
a rotor-hub, rotatable and made of a light alloy, on top of which the radially inner rings are assembled, the rotor-hub comprising a tubular portion, to which is steadily fixed a flange portion, axially external and provided with a plurality of fixing holes, whose axes are located along a second circle having a radius, with respect to the symmetry axis of the hub-bearing assembly,
wherein the radius of the first circle of the rolling elements centers is greater than the radius of the second circle of the fixing holes axes.

In a second aspect, the rotor-hub is angularly coupled to a bell of a constant velocity joint, from which the rotor-hub receives the driving torque, wherein the bell is the radially outer portion of the constant velocity joint and is co-axial and radially internal to rotor-hub.

In another aspect, the rotor-hub and the bell are angularly coupled by a milled coupling between a radially external cylindrical surface of the bell and a radially internal cylindrical surface of the tubular portion of the rotor-hub.

In yet another aspect, the rotor-hub and the bell are angularly coupled by means of a coupling between a radially external conical surface of the bell and a radially internal conical surface of the tubular portion of the rotor-hub.

In yet another aspect, the tubular portion of the rotor-hub is steadily fixed to a rolled edge, which is axially internal and configured to axially pre-load the couple of radially inner rings.

In yet another aspect, the bell further comprises a pre-formed edge, which is axially internal and configured to cooperate with the rolled edge to axially pre-load the couple of radially inner rings.

In yet another aspect, the bell further comprises a pre-formed edge, wherein the pre-formed edge is axially internal and configured to axially pre-load the couple of radially inner rings.

In yet another aspect, a tubular portion of the outer ring comprises a cylindrical surface, the cylindrical surface is radially external and configured to be coupled to a cylindrical seat of a knuckle of a vehicle suspension.

BRIEF DESCRIPTION OF THE DRAWINGS

The invention will be now described by reference to the enclosed drawings, which show some non-limitative embodiments, namely.

DETAILED DESCRIPTION OF THE PRESENT INVENTION

Figure 1:
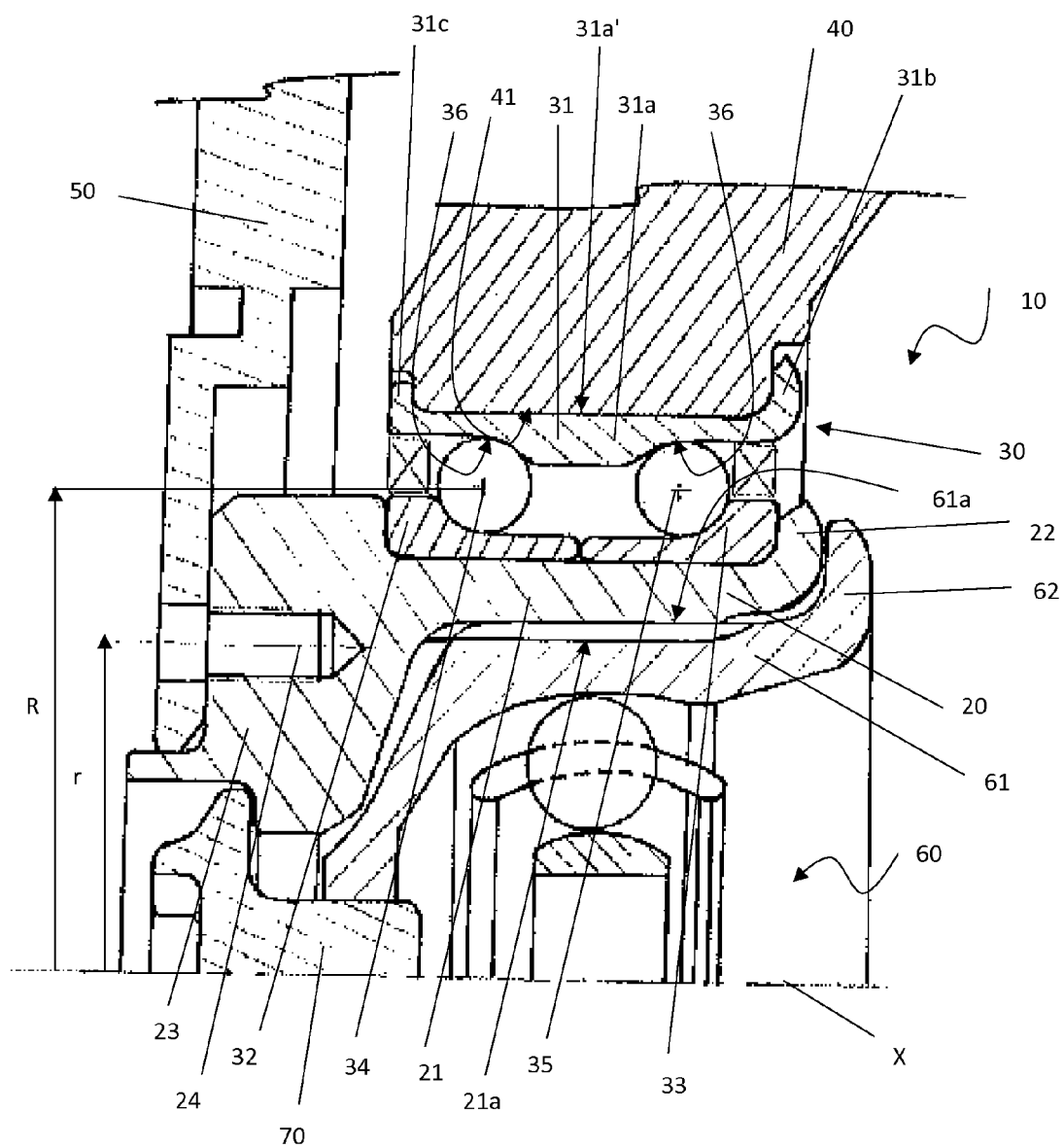
FIG. 1 is an axial-symmetrical section of the hub-bearing assembly, according to a preferred embodiment of the present invention.

With reference to FIG. 1, a hub-bearing according to a first embodiment of the invention, is referenced as a whole with 10.

The assembly 10 comprises a hub 20 and a bearing unit 30. Throughout the present description and in the claims, the terms and expressions indicating positions and orientations such as "radial" and "axial" are to be taken to refer to the axis of rotation x of the bearing unit 30. Instead, expressions as "axially external" and "axially internal" are to be referred to the assembled condition, in this case respectively to a motor vehicle wheel side and to an opposite side.

The bearing unit 30 comprises a radially outer ring 31, stationary, a pair of radially inner rings 32, 33, rotatable, and a double set of rolling elements 34, 35, in this example spheres, interposed between the outer ring 31 and the inner rings 32, 33.

The stationary outer ring 31 has a tubular main portion 31a axially extending, which internally defines the raceways 36 of the rolling elements 34, 35.

The outer ring 31 and in particular the tubular portion 31a has a radially external cylindrical surface 31a' adapted to be coupled with a cylindrical seat 41 formed in a knuckle 40 of a suspension. The cylindrical surface 31a' extends for the entire axial dimension of the outer ring 31 and has an axial dimension of the order of magnitude of the dimension of the knuckle cylindrical seat 41. The two axially opposite ends of the cylindrical surface 31a' are presented by respective axial opposite ends of the tubular projections 31b, 31c, that extend from the tubular portion 31a. The tubular projections 31b, 31c are shaped and dimensioned to be machined or to be plastically cold formed, preferably by rolling operations, in the radially outward direction so as to assume the configuration illustrated in the drawing. Preferably, the tubular projection 31b is obtained by machining before the assembly of the radially outer ring 31 on the knuckle 40, thus realizing a shoulder for the knuckle. The tubular projection 31c is obtained, after mounting the knuckle, by cold plastic forming (in particular, by riveting or other similar operation), so as to ensure the stable coupling between the knuckle and the radially outer ring. Alternatively, it is possible to perform machining to obtain the tubular projection 31c and plastic deformation to obtain the tubular projection 31b.

Preferably, the radially inner rings 32, 33 have an overall axial dimension of the same order of magnitude of the axial thickness of the knuckle 40.

The rolling elements 34, 35 rotate on the rolling rings, in particular also on the radially inner rings 32, 33, which are mounted on a flanged hub 20 shaped as a rotor and made of aluminum or other light alloy.

The hub 20 has a central tubular portion 21, which is steadily connected with a rolled edge 22, axially internal, and an axially outer flange portion 23. The flange portion has a plurality of axial fixing holes 24 the axes of which are arranged along a circle of radius r, with respect to the symmetry axis X. The holes are seats for corresponding fastening means (such as stud bolts, not shown in the figure) that connect in a known way an element of the wheel of the motor vehicle, for example the brake disc 50, to the flanged hub 20.

The flanged hub 20, made of aluminum or other light alloy, is realized in such a way that its radial extension does not exceed the radius R of the circle comprising the centers of the rolling elements 34, 35. More precisely, it is required that the radius r of the circle of the axes of the mounting holes 24 is smaller than the radius R of the circle of the centers of the rolling elements 34, 35 or at least the centers of the rolling elements 34, axially external and closest to the brake disc of the wheel of the motor vehicle.

Through this solution, the flanged hub assumes a shape as a rotor, in other words, its flange portion is very reduced and, in particular, does not radially extend beyond the diameter of the centers of the rolling elements. This allows to realize the hub 20 in a light alloy, for example aluminum, although the hub itself can withstand the loads transmitted by the wheel of the motor vehicle. The above solution is obtained by increasing the radius R of the circle of the centers of the rolling elements and obviously not varying (since it is a constraint of the project of the motor vehicle) the radius r of the circle of the axes of the fixing holes 24.

The axial preload to the pair of inner rings 32, 33 is guaranteed by the rolled edge 22 of the hub.

The transmission of the motion from a drive shaft of the transmission unit of a motor vehicle (not shown) is guaranteed by the angular coupling of the hub 20 with a constant velocity joint 60.

Having increased the radius R of the circle of the centers of the rolling elements, the constant velocity joint 60, and in particular its radially outer portion, or the bell 61, can be designed so as to be inserted in the space left free by the central rotor-hub. In this way, a very stiff unit is obtained, also compact in size and lightweight. A central screw element 70 ensures the axial connection between the constant velocity joint 60 and the hub 20. In the configuration of FIG. 1, the bell 61 has a preformed axially inner edge 62, configured to cooperate with the rolled edge 22 of the hub, thus making the whole unit even more robust.

The torque transmission between the constant velocity joint 60 and the hub 20 is realized by angularly coupling the bell 61 to the hub 20, by means of the knurled coupling between the radially outer cylindrical surface 61a of the bell and the radially inner cylindrical surface 21a of the hub.

Figure 2:
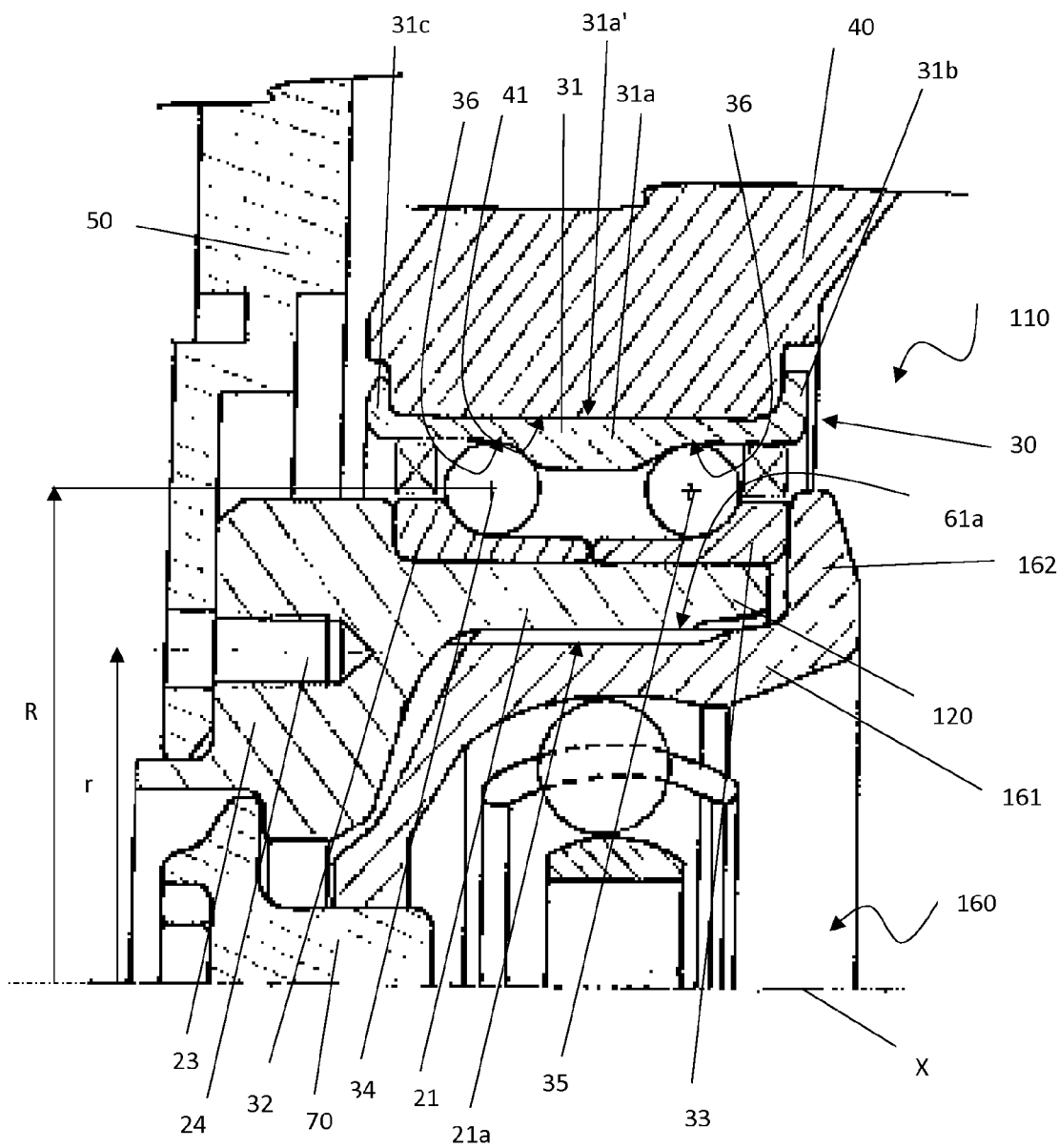
FIG. 2 is an axial-symmetrical section of the hub-bearing assembly, showing a second embodiment of the invention.

In FIG. 2 is shown a second embodiment of the present invention, where the hub-bearing assembly is referred as 110. Compared to the previous embodiment, this embodiment differs in that the hub 120 is devoid of the axially inner rolled edge. Therefore, in this solution the axial preload to the inner rings 32, 33 is guaranteed by the preformed edge 162 of the bell 161 of the constant velocity joint 160. Further aspects of this solution coincide with what has been described regarding the first embodiment.

Figure 3:
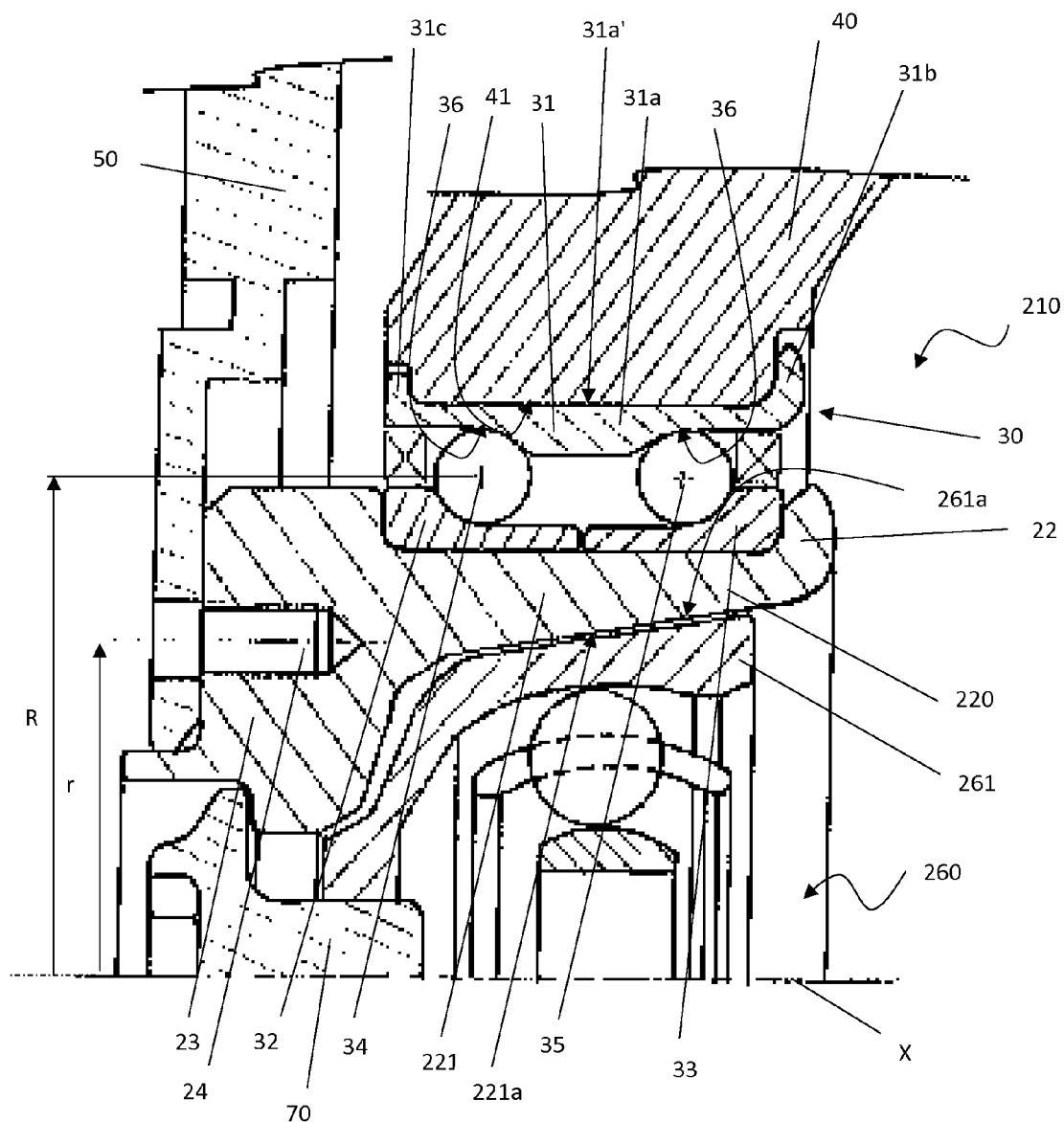
FIG. 3 is an axial-symmetrical section of the hub-bearing assembly, showing a third embodiment of the invention.

In FIG. 3, a third embodiment of the present invention is shown, where the hub bearing assembly is referred as 210. Compared to the solution of FIG. 1, in the present embodiment there are two different aspects. A first difference is the fact that the axial preload to the inner rings 32, 33 is guaranteed by the rolled edge 22 of the hub 220, as in the solution in FIG. 1, but in this case without the aid of the preformed edge of the bell. In fact, in the solution of FIG. 3, the bell 261 of the constant velocity joint 260 is devoid of preformed axially inner edge.

A second difference, compared to the first embodiment is that the transmission of torque between the constant velocity joint 260 and the hub 220 is accomplished by angularly coupling the bell 261 to the hub 220, by means of coupling between a radially outer conical surface 261a of the bell and a radially inner conical surface 221a of the tubular portion 221 of the hub 220.

Therefore, the solution created and declined in the presented embodiments allows to achieve a lightweight hub-bearing assembly, since only the bearing and the joint are made of steel while the hub is in light alloy. Moreover, the assembly has very limited axial dimensions, since the hub is almost devoid of flange portions and of the relative axial dimensions and the bell of the joint is positioned so as to be radially inside the bearing. As consequence of the increased radius of the centers of the rolling elements, a larger bearing diameter of the bearing also reduces the local loads between rings and rolling elements of the bearing. Finally, a larger diameter of the centers of the rolling elements of the bearing ensures greater resistance and durability.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A hub-bearing assembly comprising:
a bearing unit comprising a stationary radially outer ring, a couple of rotatable radially inner rings, and a double row of rolling elements, wherein the rolling elements are interposed between the radially outer ring and the radially inner rings, whose centers are located along a first circle having a first radius, with respect to a symmetry axis of the hub-bearing assembly; and
a rotor-hub, rotatable and made of a light alloy, on top of which the radially inner rings are assembled, the rotor-hub comprising a tubular portion, to which is steadily fixed a flange portion, axially external and provided with a plurality of fixing holes, whose axes are located along a second circle having a second radius, with respect to the symmetry axis of the hub-bearing assembly, wherein the rotor-hub is angularly coupled to a bell of a constant velocity joint, from which the rotor-hub receives the driving torque, wherein the bell is a radially outer portion of the constant velocity joint and is co-axial and radially internal to the rotor-hub,
wherein the first radius of the first circle of the centers of the rolling elements is greater than the second radius of the second circle of the axes of the fixing holes.

2. The hub-bearing assembly according to claim 1, wherein the rotor-hub and the bell are angularly coupled by a milled coupling between a radially external cylindrical surface of the bell and a radially internal cylindrical surface of the tubular portion of the rotor-hub.

3. The hub-bearing assembly according to claim 1, wherein the rotor-hub and the bell are angularly coupled by means of a coupling between a radially external conical surface of the bell and a radially internal conical surface of the tubular portion of the rotor-hub.

4. The hub-bearing assembly according to claim 1, the bell further comprising a pre-formed edge, wherein the pre-formed edge is axially internal and configured to axially pre-load the couple of radially inner rings.

5. The hub-bearing assembly according to claim 1, wherein a tubular portion of the radially outer ring comprises a cylindrical surface, the cylindrical surface is radially external and configured to be coupled to a cylindrical seat of a knuckle of a vehicle suspension.

6. A hub-bearing assembly comprising:
a bearing unit comprising a stationary radially outer ring, a couple of rotatable radially inner rings, and a double row of rolling elements, wherein the rolling elements are interposed between the radially outer ring and the radially inner rings, whose centers are located along a first circle having a radius, with respect to a symmetry axis of the hub-bearing assembly; and
a rotor-hub, rotatable and made of a light alloy, on top of which the radially inner rings are assembled, the rotor-hub comprising a tubular portion, to which is steadily fixed a flange portion, axially external and provided with a plurality of fixing holes, whose axes are located along a second circle having a radius, with respect to the symmetry axis of the hub-bearing assembly,
wherein the radius of the first circle of the rolling elements centers is greater than the radius of the second circle of the fixing holes axes, and
wherein the tubular portion of the rotor-hub is steadily fixed to a rolled edge, which is axially internal and configured to axially pre-load the couple of radially inner rings.

7. The hub-bearing assembly according to claim 6, wherein the rotor-hub is angularly coupled to a bell of a constant velocity joint, the bell further comprising a pre-formed edge, which is axially internal and configured to cooperate with the rolled edge to axially pre-load the couple of radially inner rings.

* * * * *